Patented Oct. 13, 1942

2,298,418

UNITED STATES PATENT OFFICE 2,298,418

PROCESS FOR MACHINING METALS USING CUTTING TOOLS

Gerhard Roesner and Ludwig Schuster, Frankfort-on-the-Main, Friedrich Karl Freiherr Göler von Ravensburg, Neu-Isenburg, near Frankfort-on-the-Main, Heinrich Faber, Berlin-Steglitz, and Hermann Riske, Genthin, Germany, assignors to American Lurgi Corporation, New York, N. Y., a corporation of New York No Drawing. Application February 28, 1939, Serial No. 259,070. In Germany March 4, 1938

9 Claims. (Cl. 29—148)

This invention relates to a process for machining metals using cutting tools.

It is known that cutting capacity in machining is dependent on the mechanical-technological properties of the material worked. It thus also happens that materials of the same analytical constitution must on occasion be machined with different cutting speeds and thickness of cutting, if differences in the physical properties of the material have been produced by previous thermal or cold treatments. When machining, this point must therefore be taken into account by adjusting the cutting speed and also the thickness of the cutting to the actual circumstances occurring. This becomes irksome particularly when manufacture requires changing over from one material to another. Especially in the mass production of articles for the total working processes of which many machines are required, disturbances occur throughout the process when changing over to a material for which only a low cutting speed is permissible, since the efficiency of the machine having the lowest capacity dictates the overall efficiency.

It is the aim of the present process to raise the cutting capacity in the machining of metals (particularly iron and steel). According to the present invention, this is accomplished by carrying out the cutting with the cooperation of a chemically active medium. Solutions adapted to change the surface of the metals, for example by etching or by forming strata, are to be regarded as chemically active. Such a treatment of the material to be cut affords advantages through various circumstances; for example, a loosening of the structure at or in the proximity of the cut surface can be achieved by etching action. In addition, it is possible to form, by using certain strata-forming chemical solutions, crystal skins of oxides of salts, such as phosphates, which considerably facilitate the action of the cutting tools, so that it is possible to work with higher cutting speeds and greater cutting thicknesses.

Thus, for example, experiments have shown that by the application of the present process cutting capacities can be obtained, for medium-hard steel, which are otherwise possible only in the machining of brass.

On occasion it might be convenient to employ a solution of the greatest possible activity, for example when machining steel of relatively great strength.

Chemical media such as belong to the class of solutions known in burnishing, phosphatising (for example Parkerising and Bonderising) and the like, are suitable for example as chemical media for the process of the present invention.

Such solutions are, for example, of the following composition (per litre):

| | Grams |
|---|---|
| Zn | 19 |
| $NO_3$ | 24.5 |
| $P_2O_5$ | 23.8 | or

| | |
|---|---|
| Mn | 4.4 |
| $P_2O_5$ | 15.5 |

Even aqueous solutions of chromic acid and chromates furnish suitable cutting liquids.

It has been found particularly favourable to add chromic acid or chromates to solutions of free phosphoric acid or phosphates, e. g. solutions such as are used in the phosphate rust-protection processes. In so doing, chromate and phosphoric acid, or phosphate and chromic acid are preferably mixed. Such solutions contain for example:

| | Grams |
|---|---|
| (1). Zn per litre | 4.4 |
| $P_2O_5$ per litre | 13.1 |
| $CrO_3$ per litre | 3.4 |
| (2). Na per litre | 3.5 |
| $P_2O_5$ per litre | 12.3 |
| $CrO_3$ per litre | 3.16 |

Solutions containing chromium, either alone or mixed with phosphate solutions, have the advantage of protecting from rusting the workpieces to be machined and also the parts of the machine tools which come into contact with cutting liquids of these compositions.

These solutions can also be employed together with suitable oils.

It is not necessary always to use fresh solutions, but on the contrary the latter can be used several times, care being taken to replace the constituents thereof which have been consumed.

The advantages obtainable with such cutting liquids are manifold. In the process of the present invention, for example, the durability of the tool is lengthened. The improvement of the shearing resistance results in improved uniformity of dimensions of the work-piece. Regrinding the tool is necessary less frequently, while the quality of the machined workpiece is the same. In additions, a higher cutting speed is possible, i. e. more rapid feed or greater cutting depth, without overstressing the tool.

The following tests will illustrate the advantages of the present invention in the case of iron and steel, as compared with the drilling oils customarily used as lubricating and cooling media:

Drilling tests were carried out, the drills being of ordinary tool steel. The cutting speed was 26.5 metres per minute, and, by comparison with the ordinary cutting speeds of 14 to 16 metres per minute for the same drills, was relatively high. The diameter of the drills was 16 mm. The drilling was carried out on drilling bits having a strength of about 40 kgs. and a diameter of 20 mm. The cutting liquid was delivered to the drilling site in a fine jet.

In the following table is shown the number of drillings that it was possible to carry out when using the cutting liquids indicated in the left-hand column until the drill became blunt in each case.

TABLE

| Cutting liquid | Number of drillings |
|---|---|
| Drilling oil=1:20 | 7 |
| 24 grams of $Zn(H_2PO_4)_2$ per litre | 34 |
| 24 grams of $Zn(H_2PO_4)_2$ + 3 grams of $CrO_3$ per litre | 94 |
| 3 grams of $CrO_3$ per litre | 42 |

When working light metals by taking off cuttings, particularly aluminium and aluminium alloys, not only phosphate solutions but also alkaline chromate solutions, soda lye and the like are suitable and may be used as such or together with oils.

The following examples will reveal the advantages obtained by the invention in the case of aluminium.

Turning tests were carried out. A block of an aluminium-silicon alloy containing 13% of silicon and 0.3% of magnesium was machined, the turning tool used being of hardened carbon steel.

The tests were carried out at turning speeds which varied between 140 and 128 metres per minute in consequence of the decline in diameter. The feed amounted to 0.25 mm. per revolution, the cutting depth 2 mm. The turning lengths indicated below indicate the total displacement of the slide rest during a test, i. e. not the length of the cutting.

By way of comparison with the process of the invention tests were also carried out with the customary drilling oil. The first time the tool failed after a turning length of 120 mm. because a cutting attached itself to the cutting edge; the cutting was removed and after a further 5 mm. the tool failed again for the same reason. In a second test cuttings had to be removed at 115, 180, 235 and 265 mm. The tool still continued each time thereafter in a barely satisfactory manner, although in practice it would already have been ground on the first occasion. After a turning length of about 300 mm. it definitely failed.

By comparison with these examples, the following show the advantages obtained according to the invention in the case of aluminium, the first example referring to a phosphate solution of similar composition to that used in the machining of iron, while the second refers to the alkaline solutions particularly suitable for aluminium:

Example I

A nitrate-containing zinc phosphate solution of the composition: 19 grms. of zinc, 24 grms. of $NO_3$ and 24 grms. of $P_2O_5$ per litre, such as is used for rust-protection processes, was used as cutting liquid. The tool ran very well for 650 mm., then became gradually worse and finally failed at 700 mm. The cuttings ran off better than when using drilling oil.

Example II

A solution of 5% of calcined sodium carbonate and 1.5% of sodium chromate was used as cutting liquid. The tool ran for 1100 mm. without difficulty. The cuttings ran off well. With this solution the surface of the metal was smoother than when using drilling oil. The cutting edge then gradually became blunt.

We claim:

1. In machining metals, the step of cutting the metal in the presence of an aqueous phosphatizing solution.

2. In machining metals, the step of cutting the metal in the presence of an aqueous solution containing the chromic acid radical and the phosphoric acid radical which is chemically active on the metal.

3. In machining light metals and alloys thereof, the step of cutting the metal in the presence of an aqueous solution of a chromate of an alkali metal which is chemically active on the metal.

4. In machining light metals and alloys thereof, the step of cutting the metal in the presence of an aqueous solution of a phosphate of an alkali metal which is chemically active on the metal.

5. In machining light metals and alloys thereof, the step of cutting the metal in the presence of an aqueous solution of soda lye which is chemically active on the metal.

6. In machining iron, steel and alloys thereof, the step of cutting the metal in the presence of an aqueous solution which contains the chromic acid radical which is chemically active on the metal.

7. In machining iron, steel, and alloys thereof, the step of cutting the metal in the presence of an aqueous solution of chromic acid which is chemically active on the metal.

8. In machining metals, the step of cutting the metal in the presence of a stream of an acid aqueous solution which contains the chromic acid radical capable of reacting with the metal being cut to form a layer on the metal which protects the metal against attack.

9. In machining metals, the step of cutting the metal in the presence of a stream of an aqueous solution containing the phosphoric acid radical which is capable of reacting with the metal being cut to form a layer on the metal which protects the metal against attack.

GERHARD ROESNER.
LUDWIG SCHUSTER.
FRIEDRICH KARL FREIHERR
    GÖLER VON RAVENSBURG.
HEINRICH FABER.
HERMANN RISKE.